United States Patent Office 3,770,677
Patented Nov. 6, 1973

3,770,677
ADHESIVE STICK
Thomas S. Mestetsky, Easton, Pa., assignor to GAF Corporation, New York, N.Y.
No Drawing. Filed Sept. 28, 1971, Ser. No. 184,617
Int. Cl. C08f 45/52; C09j 3/26
U.S. Cl. 260—28.5 R
9 Claims

ABSTRACT OF THE DISCLOSURE

There are disclosed herein novel adhesive sticks which contain from 20% to about 96% by weight of a wax, from about 4% to about 80% by weight of alkylated polyvinylpyrrolidone polymers which are waxy solids at room temperature and optional additives such as tackifiers, extenders, dyes, surfactants and anti-oxidants to obtain any combination of desired characteristics and function of the adhesive stick. The adhesive stick has particular application as adhesive for easy to bond substrates such as paper.

---

The present invention relates to a novel solid adhesive in the form of a stick which can be manufactured at low cost and can be readily applied as an adhesive for easy to bond substrates; and more specifically, to an adhesive stick containing wax and alkylated polyvinylpyrrolidone polymers which are waxy solids at room temperature.

Adhesives now in common use for bonding easy to bond substrates such as paper, foamed polymeric styrene, cardboard, cork, photographs, album paper, scrapbooks, construction paper, Bristol board and the like, are almost all dispersions or solutions in water or other solvents. Examples of these materials are paste, animal glues and polyvinyl acetate emulsion products. While these products have good bonding properties, they have many disadvantages such as being susceptible to spillage, particularly, when used by children; forming adhesive crusts which clog applicator tips and causing inefficient or esthetically displeasing glue seams. In order to overcome the disadvantages of existing adhesive materials, it has been proposed that a solid adhesive material be developed which can be readily applied by merely rubbing it on a surface of the material to be bonded. After considerable effort, such adhesive solids were commercially developed but they have very low tack. Also, these solid adhesives, during application, were found to be stringy, thereby leavin a very uneven deposit of the adhesive on the material to be bonded.

It has now been discovered that solid adhesives in the form of sticks can be made without the inherent disadvantages of existing solid adhesives by formulating the stick from wax and alkylated polyvinylpyrrolidone polymers which are waxy solids at room temperature (68–72° F.). The adhesive stick is used by merely rubbing it on the substrate which is to be bonded.

The types of waxes which can be used in the present invention are not critical provided they are solid at room temperature and have melting ranges below 250° F. Examples of such waxes are the petroleum waxes such as paraffin and microcrystalline wax; animal waxes such as beeswax, Chinese wax (insect wax), shellac and spermaceti; vegetable waxes such as candelilla, carnauba, Japan wax, ouricary and sugar cane; mineral waxes such as ceresin, montan and azocerite and synthetic waxes such as esters of polyhydric alcohols, cetyl and stearyl alcohols and stearic and palmitic acids. It is not intended to limit the waxes to those heretofore exemplified and other suitable waxes which can be used are well known to those skilled in the art.

The alkylated polyvinylpyrrolidone polymers suitable for use in preparing the adhesive sticks of the present invention are waxy solids at room temperature. These polymers are prepared from homopolymerized lower alkyl substituted N-vinylpyrrolidones alkylated with an alpha-olefin having a chain length from about $C_{16}$ to about $C_{20}$. It has been found that the average molecular weight of the polymers which are waxy solids at room temperature is generally above about 7,500 and preferably ranges from about 8,000 to about 200,000. The molecular weight of the polymer can be readily determined by relative viscosity measurements as described in Modern Plastics, 23 No. 3, 157–61, 212, 214, 216 and 218 (1945). It has also been found that adhesive sticks which apply easily and uniformly can be made when the polymers consist of from about 20 parts to about 50 parts of the N-vinylpyrrolidone, the balance being the alkane group. Examples of the polymers which can be used to prepare the adhesive stick as well as the process for making them as well known and are described in U.S. Pat. Nos. 3,417,054 and 3,479,417 which are incorporated herein by reference.

Another important advantage of the present adhesive stick is that it is compatible with many types of additives. Thus, the adhesive stick can be formulated to obtain a predetermined feature. This is particularly important where a water dispersible stick is required. In this case, a water-soluble surfactant is incorporated into the formulation in an amount effective to give the desired water dispersion characteristic. Excellent results are obtained when the surfactant is nonionic, although anionic, ampholytic and zwitterionic compounds can also be employed. The surfactants are well known and patent and printed literature are replete with disclosures of such compounds. Typical of such literature are "Surface Active Agents" by Schwartz and Perry and "Surface Active Agents and Detergents" by Schwartz, Perry and Berch, the disclosures of which are incorporated herein by reference.

The tack of the adhesive stick can be improved by adding up to about 50% by weight and preferably, from about 10% to 30% by weight of any of the available tackifiers such as polybutene, polyvinyl isobutylether, indene resins, terpene polymer resins, low molecular weight copolymers of olefins and vinyl pyrrolidones, phenol resins, resorcinol-formaldehyde resins and rosin or its ester. The only requirements as to the choice of the tackifier employed is that it be a viscous liquid or tacky semi-solid, hereinafter referred to as a pseudo-solid at room temperature and is compatible with the polymer and wax.

Other additives can also be used in the adhesive stick such as extenders including inorganic pigments, dyes and antioxidants which will serve as a stabilizer during the blending of the ingredients.

The following examples will illustrate further the present invention without, however, limiting the same thereto. Unless otherwise stated, all percentages and parts in the examples are by weight.

CONTROL

100% of a 172° AMP microcrystalline wax (sold commercially under the name Mobilwax 2305 by Mobil Oil Company) is melted in a beaker in a steam bath at 200° F. to 210° F. The melted wax is poured into a tube formed by rolling a sheet of silicone treated release paper and stoppering one end. When the wax has cooled, the paper is removed, and a crayonlike stick, tacky to the touch, is formed. When this stick is rubbed briskly onto a sheet of No. 4 bond paper, it deforms at the point of friction and no transfer of adhesive to the paper takes place.

This comparative example demonstrates that if wax is used without the alkylated polyvinylpyrrolidone polymer, the proper consistency is not obtained and no adhesive is left on the substrate, notwithstanding the fact that the wax is tacky to the touch.

Example I.—Wax formulated with alkylated polyvinylpyrrolidone polymer

An adhesive stick is made in the same manner as in the Control example except that 75% of the microcrystalline wax is blended with 25% of a polymer of 20 parts N-vinyl pyrrolidone and 80 parts $C_{20}$ alpha-olefin which is a waxy solid having a melting point of 32–36° C. and average molecular weight of 8600. This product applied easily and uniformly to No. 4 bond paper, and, when mated to another similar sheet, gives a paper holding bond. Tack is found to be acceptable.

Example II.—Wax formulated with alkylated polyvinylpyrrolidone polymer and a tackifier An adhesive stick is made and tested in the same manner as Example I except the blend consists of 62.5% of the microcrystalline wax, 20.8% of the alkylated polyvinylpyrrolidone polymer, and 16.6% of a polybutene having an average molecular weight of 2060, pour point of 65° F., and specific gravity of .9042 (Amoco Indopol H 1500). This stick applies easily and uniformly, forms a paper holding bond and has a good tack.

Example III.—A water dispersible adhesive stick

An adhesive stick is made and tested in the manner of Example I, except the blend consists of 69% of the microcrystalline wax, 4.6% of a polymer consisting of 50 parts by weight of N-vinylpyrrolidone and 50 parts by weight of $C_{16}$ alpha-olefin which is a waxy solid having a melting point of 83–90° C. and a molecular weight of 9500, 12.4% of a liquid polymer tackifier consisting of 20 parts of N-vinyl-pyrrolidone and 80 parts $C_{16}$ alpha-olefin, having an average molecular weight of 7300, and 13.8% of a waxy nonionic surfactant with the following structure:

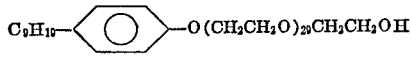

This stick applies easily and uniformly, forms a paper holding bond, and has good tack.

Examples IV–VII

Adhesive sticks are made using the procedure of Example II with the following formulations:

| Formulation (parts by weight) | IV | V | VI | VII |
|---|---|---|---|---|
| 172° AMP¹ microcrystalline wax (Mobilwax 2305) | 43.8 | 60.0 | | |
| 140° AMP¹ paraffin | | | | 59.9 |
| Alkylated polyvinylpyrrolidone polymer of Example I | 21.9 | 20.0 | 4.6 | 20.0 |
| Polyvinyl isobutylether | 34.3 | 20.0 | 35.5 | 20.0 |
| Beeswax | | | 60.0 | |

¹ AMP = American melting point.

All four sticks show uniform and easy application and show good paper holding bond.

It is intended to cover all changes and modifications of the preferred embodiments of the invention, herein chosen for the purpose of illustration, which do not constitute departures from the spirit and scope of the invention.

What is claimed is:

1. A solid adhesive stick consisting essentially of, by weight,
   (a) about 20% to about 96% of a wax having a melting point below 250° F. and selected from the group consisting of petroleum waxes, animal waxes, vegetable waxes, mineral waxes, esters of polyhydric alcohols, cetyl and stearyl alcohols and stearic and palmitic acids,
   (b) about 4% to about 80% of a waxy solid alkylated polyvinylpyrrolidone consisting of about 20 to 50 parts of N-vinylpyrrolidone moieties and about 80 to about 50 parts of $C_{16-20}$ alkyl moieties,
   (c) 0 to about 50% of a tackifier which is compatible with components (a) and (b) and is a psuedo-solid at room temperature, and
   (d) a water soluble surfactant selected from the group consisting of anionic, nonionic, ampholytic and zwitterionic compounds in an amount effective to render said stick water dispersible.

2. The solid adhesive stick of claim 1 wherein the tackifier is present in amounts of from about 10 to about 50% by weight.

3. The solid adhesive stick of claim 2 wherein said tackifier is polybutene.

4. The solid adhesive stick of claim 1 wherein the wax is chosen from the group consisting of microcrystalline wax, beeswax and paraffin.

5. The solid adhesive stick of claim 1 wherein the alkylated polyvinylpyrrolidone polymer exhibits an average molecular weight above about 7500.

6. The solid adhesive stick of claim 1 wherein the alkylated polyvinylpyrrolidone polymer contains 20 parts N-vinylpyrrolidone and is prepared with an alpha-olefin having a chain length of $C_{20}$.

7. The solid adhesive stick of claim 1 wherein the surfactant is a nonionic surfactant having the formula:

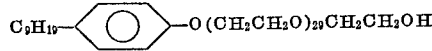

8. The solid adhesive stick of claim 1 wherein the surfactant is a nonionic surfactant.

9. The solid adhesive stick of claim 1 wherein the wax is microcrystalline wax.

References Cited

UNITED STATES PATENTS

| | | | |
|---|---|---|---|
| 3,417,052 | 12/1968 | Merijan | 260—28.5 R |
| 3,491,043 | 1/1970 | Zmitrovis | 260—28.5 A |
| 2,746,910 | 5/1956 | Mills | 260—28.5 R |
| 3,267,052 | 8/1966 | Brennan | 260—27 R |
| 3,539,481 | 11/1970 | Parker | 260—28.5 A |
| 3,526,522 | 9/1970 | Seregely | 260—28.5 A |

MORRIS LIEBMAN, Primary Examiner

P. R. MICHL, Assistant Examiner

U.S. Cl. X.R.

117—122 PA; 260—37 R, 28.5 A